Nov. 28, 1933.   J. RUBERG   1,936,860
PHOTOGRAPHIC CAMERA
Filed Feb. 13, 1932

Inventor:
Josef Ruberg

By
Attorney

Patented Nov. 28, 1933

1,936,860

UNITED STATES PATENT OFFICE 1,936,860

PHOTOGRAPHIC CAMERA

Josef Ruberg, Hagen, Westphalia, Germany

Application February 13, 1932, Serial No. 592,683, and in Germany June 17, 1931

1 Claim. (Cl. 95—39)

This invention relates to a photographic camera, the case of which and also the mountings for the lens are made of artificial resin. This material presents the advantage that the case and all other parts thereof are finished, if desired in different colors, in one pressing operation.

A further feature of the invention consists in that the lens is carried by one or more mountings also made of press mass, these mountings being according to the invention provided with uniformly directed screw-thread on their outer circumference which is arranged so that each mounting can be screwed completely tight by one single rotation, a predetermined focus being always set at the same time.

In the case of several mountings being employed, they are screwed the one in the other so that the mountings occupy a very small space in the case and the case itself need not be very deep.

An embodiment of the invention is illustrated by way of example in the accompanying drawing, in which:—

Figure 1:
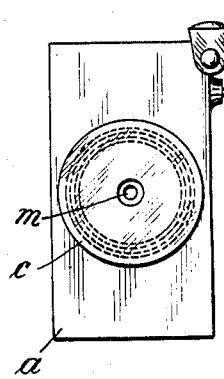
Fig. 1 shows the camera in front elevation.
Figure 3:
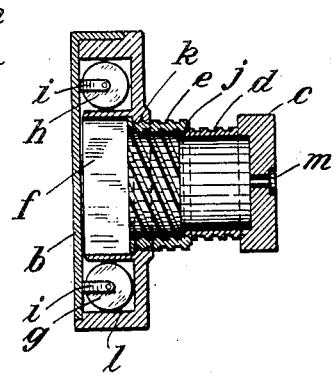
Fig. 3 is a similar view to Fig. 2, showing the camera in position for use.
Figure 2:
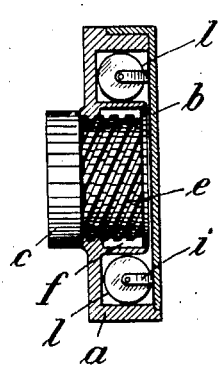
Fig. 2 is a vertical longitudinal section of Fig. 1, the camera in inoperative position.
Figure 4:
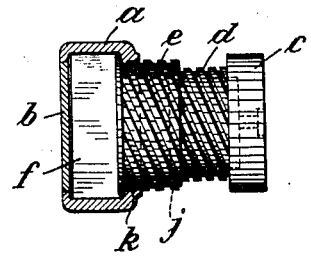
Fig. 4 is a horizontal longitudinal section of the camera in position for use.

The case $a$, the rear cover $b$ and the mountings $e$ and $d$ are made of artificial resin so that these parts can be made in a single pressing operation even if they are to be of different colors.

During the pressing operation the recesses $g$ and $h$ for the spools $l$ and slots $i$ for the spool axles are formed at the same time in the case $a$.

A collar $c$, in which the lens $m$ is mounted, is provided on the mounting $d$. The mounting $d$ has an external screw thread which by one single rotation screws on its entire length into the mounting $e$ as on the front end of the mounting $e$ screw threads $j$ are arranged.

The mounting $e$ is also provided with a screw thread extending in the same direction as that of the mounting $d$, and this mounting $e$ can be completely screwed into the hollow space $f$ of the case $a$ also by a single rotation, the screw thread on the outer surface of the mounting $e$ being guided in an internal screw thread $k$ in the case $a$.

The rear cover $b$ is also made of artificial resin and tightly closes the case $a$.

It is evident that a slide with plates can be inserted instead of the cover $b$ so that the camera may also be employed for plates. Moreover, film packs may be used by slipping a film pack holder into the case $a$ instead of the cover $b$.

On the front side of the case $a$ a view finder $n$ and also the usual focusing means are arranged, for which purpose suitable extensions are formed on the case during the pressing.

A guide boss for the turning device $o$ of the film situated in the case is arranged on the side of the case $a$.

Owing to this extremely simple and cheap production of all parts of the camera from artificial resin, as these parts can always be made in one single pressing operation, it is possible to place on the market an extremely cheap camera available for everybody.

I claim:—

In a camera composed exclusively of parts made of artificial resin the combination of a case and a lens carrier composed of two parts provided with screw threads adapted to be guided the one in the other and to be screwed into and out of said case.

JOSEF RUBERG.